Patented Dec. 19, 1950

2,534,908

UNITED STATES PATENT OFFICE 2,534,908

METHOD FOR THE MANUFACTURE OF MOLDED ARTICLES

Tibor Holzer, Zurich, Switzerland

No Drawing. Application August 28, 1946, Serial No. 693,589. In Switzerland January 9, 1946

10 Claims. (Cl. 106—123)

This invention relates to molded articles and the process by which they are produced.

It is well known that sulphite cellulose waste liquor which is obtained in large quantities as a by-product of the sulphite cellulose process and which contains ligno-sulphonic acid and carbohydrates forms with proteins such as casein, gelatine, blood etc., a precipitate the so called ligno-glutin. Thus the German Patents 352,138 and 353,570 describe the manufacture of a liquid adhesive substance from sulphite waste liquor by the action of casein and calcium oxide or magnesium oxide. The waste liquor is thereby first evaporated to dryness and only thereafter admixed with casein and alkaline substances. The German Patent 354,233 discloses a process according to which sulphite waste liquor, after addition of a solution of glue, can be worked to a liquid adhesive. In all processes hitherto known the adhesives prepared from sulphite cellulose waste liquor by the aid of proteins are dissolved either in water or in alkaline solutions or in concentrated sulphite waste liquor and so used as a liquid adhesive.

On the other hand it was not known that sulphite cellulose waste liquor can be precipitated on carriers by the aid of animal albuminous substances such as casein, gelatine, bone glue, blood etc. so that it may be used as a valuable binding material for the manufacture of molded and pressed articles.

The process according to the present invention now proposes a novel use for sulphite cellulose waste liquor which is so destructive of fish and generally undesirable in waste waters.

The sulphite cellulose waste liquor which is practically freed from its sugar content and contains about 8–10% of dissolved solids is admixed, before or after its treatment for the production of alcohol or yeast, with animal albuminous substances whereby the separating ligno-glutin is directly precipitated on carriers by the aid of precipitating substances such as diluted mineral acids or substances with acid reaction such as alum and the resulting product thereafter molded. Thereby the tedious filtration followed by a redissolution of the binding material is avoided and a direct use of the ligno-glutin as binding material is rendered possible.

According to the present process an essential part of the normally troublesome organic substances contained in the sulphite waste liquor can be removed and used as a binding material in the manufacture of wood fibre plates, and linoleum substitutes as well as pressed articles of all kinds.

The sulphite waste liquor can be treated in every suitable concentration, before or after the process for the manufacture of alcohol or yeast, but is preferably treated in concentrations of 6° Bé. to 35° Bé. The required amount of albumins depends in every case on this concentration of sulfite waste liquor.

As albuminous substances the waste products of the manufacture of glue and cheese, such as diluted glue-gelatine solution, skim milk etc. are preferably used. The precipitation of the binding material does not require any special installation and can be performed in large wooden vats provided with mechanical stirring devices at temperatures of about 20° to 40° C.

As carriers for the binding material (substrate) I prefer to use wood waste of any kind, corkpowder, and sawdust, either alone or a mixture of two or more of the afore-mentioned substances. Of special interest is the use of the peeling chips, i. e., bark, obtained as a worthless waste product in the manufacture of cellulose. However these chips must be broken up by a special process before being used.

Pressed plates or slabs manufactured from peeling chips, either provided on both sides with veneer-plates glued thereon or without veneer plates, are especially suitable for the manufacture of furniture of any type, including doors, window-frames, building plates, panels, or pressed articles of any kind.

The pressing of the mass may be performed in cold or warm state at pressures of about 10,000 to 250,000 kgs. per m.$^2$ according to the required character and strength of the article.

The carriers for the binding material may also be coloured or coated with wax or cellulose lacquers. By addition of potassium silicate or sodium silicate the products may also be made incombustible.

Whereas the products manufactured with the above mentioned substances yield excellent hard plates for building purposes I have further found that it is possible to obtain essential improvements, especially in the manufacture of insulating plates, if I use a cellulose containing fibrous material, such as wood-pulp, cellulose or waste paper either alone or as a mixture of two or more of these substances.

A further improvement in quality may also be obtained by addition of formaldehyde or substances yielding formaldehyde to the mass before precipitation, the formaldehyde having a hardening effect during the finishing process of the moulded articles.

In many cases the joint use of disintegrated peeling chips is advisable. Moreover it is possible to work with the same additions as mentioned above.

*Example 1*

Five hundred parts by weight of shavings, cork-powder etc. are steamed for about 20 minutes and then admixed with 2000 to 4000 parts by weight of a 6° Bé. sulphite cellulose waste liquor and stirred until a uniform dispersion is obtained. Then, at a temperature of 20–40° C., 40 to 100 parts by weight of bone glue dissolved in water are added while vigorously stirring the mixture. Thereafter the mixture is acidified with 50–90 parts of diluted hydrochloric acid (1 part of concentrated acid to 1 part of water) until a pH of 3 to 4 is reached, and stirred for an additional 30 minutes. The liquid is then decanted and the remaining mass thoroughly kneaded, the water drained off and then pressed at 160 to 250° C. under a pressure of 10,000 to 250,000 kg./m.²

*Example 2*

Five hundred parts by weight of wood pulp or cellulose waste paper, shavings, etc. are admixed with a mixture of 2000 to 4000 parts by weight of a 6° Bé. sulphite cellulose waste liquor and 20 to 35 parts by weight of bone glue dissolved in water and stirred until a uniform dispersion is obtained. The whole mixture is then acidified with 40 to 80 parts of sulphuric acid (1 part concentrated sulphuric acid to 1 part of water) until a pH of 3 to 4 is reached and stirred for an additional 20 to 90 minutes. The precipitating temperature is about 20 to 30° C. After standing, the liquid is decanted or pumped through a strainer, the separated water drained off and the residue moulded and pressed at a temperature of about 80–120° C. and at a pressure of about 50,000 to 400,000 kg./m.²

If desired, the mass can be treated with 10 to 25 parts by weight of formaldehyde previous to the precipitation of the binding material.

The heating of the formed masses disclosed in the foregoing examples serves to effect additional reaction of the components of the masses and thereby provides unitary hardened molded products.

If in one of the aforementioned examples instead of bone glue or gelatine casein is used, the precipitation of the binding material is effected with calcium-oxide or magnesium-oxide at temperatures of about 30 to 80° C.

I claim:

1. A process of manufacturing molded articles consisting of (1) forming an admixture of dilute commercial sulfite waste liquor, an animal glutinous protein, and a cellulosic aggregate, (2) precipitating ligno-glutin from the resulting mass directly on said aggregate carrier by adding an acidic precipitant, (3) removing the excess liquid, and (4) molding and heating the resulting wet acidic mass at elevated temperatures and pressures to form a unitary molded product.

2. A process of manufacturing molded articles consisting of (1) admixing dilute commercial waste liquor, an animal albuminous substance, and a cellulosic aggregate, (2) precipitating ligno-glutin from the resulting mass directly on said aggregate carrier by an added dilute mineral acid, (3) removing the excess liquid, and (4) molding and heating the resulting wet acidic mass at elevated temperatures and pressures to form a unitary molded product.

3. A process of manufacturing molded articles consisting of (1) admixing commercial sulfite waste liquor, an animal glutinous protein, and a cellulosic aggregate, (2) precipitating the solids content from the resulting mass directly on said aggregate carrier by adjusting the pH of the mass to a pH of the order of 3 to 4 by the addition of a mineral acid precipitant, (3) separating excess liquid, and (4) molding and heating the resulting wet acidic mass at elevated temperatures and pressures to form a unitary molded product.

4. A process of manufacturing molded articles consisting of (1) admixing commercial sulfite waste liquor, an animal glue, and fibrous wood aggregate, (2) forming and precipitating ligno-glutin from the resulting mass directly on said aggregate carrier by an added acidic precipitant, (3) removing the excess liquid, and (4) molding and heating the resulting wet acidic mass thereby forming a unitary solid article.

5. A process of manufacturing molded articles consisting of (1) admixing commercial sulfite waste liquor, gelatin, and a cellulosic aggregate, (2) forming and precipitating ligno-glutin from the resulting mass directly on said aggregate carrier by adding an acidic precipitant, (3) removing the excess liquid, and (4) molding and heating the resulting wet acidic mass thereby forming a unitary molded product.

6. A process of manufacturing molded articles consisting of (1) admixing commercial sulfite waste liquor, animal blood albumen, and a cellulosic aggregate, (2) forming and precipitating ligno-glutin from the resulting mass directly on said aggregate carrier by an added acidic precipitant, (3) removing the excess liquid, and (4) hot molding the resulting wet acidic mass thereby forming a compacted unitary molded product.

7. A process of manufacturing molded articles consisting of (1) admixing dilute commercial sulfite waste liquor, an animal glutinous protein, and a disintegrated fibrous aggregate derived from wood, (2) forming and precipitating ligno-glutin content from the resulting mass directly on said aggregate carrier by an added acidic precipitant, (3) removing excess liquid, and (4) molding and heating the resulting mass at elevated temperatures and at a pressure of at least 10,000 kilograms per square meter thereby forming a unitary molded product.

8. A process of manufacturing molded articles consisting of (1) admixing dilute commercial sulfite waste liquor, an animal albuminous substance, and a dilute aqueous dispersion of fibrous cellulose aggregate, (2) forming and precipitating ligno-glutin from the resulting mass directly on said aggregate carrier by an added acidic precipitant, (3) removing the excess moisture, and (4) molding the resulting wet acid mass and heating at temperatures of the order of 160–250° C. to form a unitary molded cellulosic product.

9. A unitary molded cellulosic aggregate manufactured by a process consisting of (1) forming an admixture of dilute commercial sulfite waste liquor, an animal glutinous protein, and a cellulosic aggregate, (2) precipitating ligno-glutin from the resulting mass directly on said aggregate carrier by adding an acidic precipitant, (3) removing the excess liquid, and (4) molding and heating the resulting wet acidic mass at elevated temperatures and pressures to form a unitary molded product.

10. A unitary molded cellulosic aggregate manufactured by a process consisting of (1) admixing dilute commercial sulfite waste liquor, an animal albuminous substance, and a dilute aqueous dispersion of fibrous cellulose aggregate, (2) forming and precipitating ligno-glutin from the resulting mass directly on said aggregate carrier by an added acidic precipitant, (3) removing the excess moisture, and (4) molding the resulting wet acid mass and heating at temperatures of the order of 160-250° C. to form a unitary molded cellulosic product.

TIBOR HOLZER.

REFERENCES CITED

The following references are of record in the file of this patent:

UNITED STATES PATENTS

| Number | Name | Date |
|---|---|---|
| 491,284 | Gumbel | Feb. 7, 1893 |
| 550,712 | Ekman | Dec. 3, 1895 |
| 1,501,975 | Strehlnert | July 27, 1924 |
| 2,116,227 | Wimlof | May 3, 1938 |
| 2,200,784 | Wallace | May 14, 1940 |
| 2,355,180 | Remy | Aug. 8, 1944 |

FOREIGN PATENTS

| Number | Country | Date |
|---|---|---|
| 527,894 | Great Britain | Oct. 17, 1940 |
| 52,854 | Switzerland | May 20, 1910 |